Patented May 9, 1933

1,907,591

UNITED STATES PATENT OFFICE

WALTER SCHOELLER, ERWIN SCHWENK, AND MAX GEHRKE, OF BERLIN, GERMANY, ASSIGNORS TO SCHERING-KAHLBAUM A. G., OF BERLIN, GERMANY

ACYLATED DERIVATIVES OF THE TESTICLE HORMONE

No Drawing. Application filed December 10, 1931, Serial No. 580,214, and in Germany July 9, 1930.

Our invention refers to derivatives of the testicle hormone, which is known to be a hydroxyketone having the formula $C_{16}H_{26}O_2$, and more especially to acyl derivatives.

We have found that the testicle hormone can be converted into acyl derivatives by acting thereon with acylating agents such as acetyl chloride, benzoyl chloride, stearoyl chloride and other acid chlorides of a similar character and that these acyl derivatives possess the important property of having a more lasting action than the testicle hormone itself.

The testicle hormone forming the starting material can be prepared from the urine of young men, preferably between twenty and thirty years of age, for instance by concentrating the urine, extracting same with fatty oils, for instance olive oil or sesame oil, and extracting the hormone from the oily solution by shaking same with volatile solvents not miscible with the oil, such as methanol, ethanol, isopropyl alcohol or another similar alcohol, which is then evaporated. One may, however, also extract the concentrated urine after acidulation with chloroform, from which the hormone can be recovered in a known manner (see Moore, Gallagher and Koch, Americ. Journ. of Anatomy, vol. 45, 1929; and Americ. Journ. of Physiol., vol. 87, p. 436, 1929). Instead of starting from urine one can recover the hormone from the corresponding animal glands by methods similar to those disclosed for the recovery of the follicle hormone in "Klinische Wochenschrift" 9, 772 (1930), and in "Journal Biol. Chemistry 84, 495 (1929).

The efficiency of preparations containing the testicle hormone can best be ascertained according to the methods described by Schoeller and Gehrke (Wiener Archiv für innere Medizin, Vol. XXI, p. 329).

According to this method, if Leghorn cocks are gelded before they have reached puberty, preferably at the end of the second or at the beginning of the third month after birth, the comb will shrink and will ultimately stop at a certain size. This varies only very little during the further growth of the animal, so that the comb of fullgrown capons remains very small as compared with cocks of the same race. If such capons are treated with injections of preparations containing the testicle hormone, the comb will start growing and if a sufficient quantity has been injected, will reach the size of a normal cock's comb. If the treatment is interrupted during some weeks, the comb will shrink again and assume substantially its initial size. In the following description the term "capon unit" is intended to designate that quantity of the testicle hormone, which when injected twice within twenty-four hours to at least three capons of equal weight, causes an average growth of the comb amounting to 20%.

While, as explained above, the effect exerted by the non-acylated hormone soon comes to an end after the injections have been stopped, so that the comb begins shrinking again, the acylated preparations of the testicle hormone are distinguished by an action of very long duration. This prolongation of action is extremely valuable in practical use, because it allows imitating the lasting effect exerted by the hormone existing in the living organism in contradistinction to the non-acylated hormone, which only causes a single "hormone impulse". It is thus possible to achieve with small quantities of the acylated hormone preparation the same effects as with larger quantities of the free hormone, to which must be added the advantage that few injections are required. If the new compounds are dispensed per os, about the five to tenfold quantity of substance is required for obtaining the same effect as by means of injections.

In practicing our invention we prefer for instance proceeding as follows:

Example 1

20 milligrams testicle hormone prepared from 50 kilograms urine are treated by shaking in watery suspension with 20 milligrams stearoyl chloride, caustic soda being added for the purpose of taking care that the reaction of the mixture remains alkaline if tested with phenol phthaleine. After the acylation has come to an end, the liquid is acidulated and the mixture extracted with petrol ether. On the petrol ether having been evaporated, there remains over the stearoyl derivative of the hormone under the form of white crystals which readily dissolve in oils and in solvents for fat. In oily solution the preparation is particularly well suited for injection. Its action, as compared with that of a corresponding quantity of the free hormone, which lasts only 2–3 days, lasts about 14 days longer.

*Example 2*

If the stearoyl chloride mentioned in Example 1 is replaced by benzoyl chloride, there is obtained the benzoyl derivative of the testicle hormone, which as far as its properties and action are concerned, corresponds to the stearate obtained in accordance with Example 1, however, its effect is a still more lasting one.

*Example 3*

5 grams of a hormone preparation recovered from male urine are heated during 1 hour under the reflux condenser with 25 ccms acetic acid anhydride, whereby the hormone is dissolved altogether. The anhydride in excess being distilled off the residue is subjected to fractional distillation in a high vacuum (not above 0,02 millimetres mercury column). At a pressure of 0.01 millimeter there passes over between 80–140° C. an oil of yellowish colour which contains the acetylated testicle hormone.

By replacing the acetic acid by oleic acid, crotonic acid or other unsaturated acids, similar acid derivatives are obtained.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. As products, the acyl derivatives of the testicle hormone being colourless oily or crystallized substances soluble in oils and organic solvents which, in physiological respect, show the same effect as the free hormone, but a longer lasting action after injection.

2. As products, the fatty acid derivatives of the testicle hormone, which are soluble in oils and organic solvents which, in physiological respect, show the same effect as the free hormone, but a longer lasting action after injection.

3. As a product, the stearoyl derivative of the testicle hormone being a crystallized substance readily soluble in oils and organic solvents which, in physiological respect, show the same effect as the free hormone, but a longer lasting acting after injection.

4. The method of producing acyl derivatives of the testicle hormone comprising reacting the testicle hormone with an acylating agent.

5. The method of producing a fatty acid derivative of the testicle hormone comprising acting on the testicle hormone with a fatty acid chloride.

6. The method of producing the stearoyl derivative of the testicle hormone comprising acting on the testicle hormone with stearoyl chloride.

In testimony whereof we affix our signatures.

WALTER SCHOELLER.
ERWIN SCHWENK.
MAX GEHRKE.